United States Patent
Umezawa et al.

(10) Patent No.: US 8,623,528 B2
(45) Date of Patent: Jan. 7, 2014

(54) METHOD OF MANUFACTURING PERPENDICULAR MAGNETIC RECORDING MEDIUM AND PERPENDICULAR MAGNETIC RECORDING MEDIUM

(75) Inventors: Teiichiro Umezawa, Singapore (SG); Masafumi Ishiyama, Singapore (SG); Tokichiro Sato, Singapore (SG); Kenji Ayama, Singapore (SG); Takahiro Onoue, Singapore (SG); Junichi Horikawa, Singapore (SG)

(73) Assignee: WD Media (Singapore) Pte. Ltd., Singapore (SG)

( * ) Notice: Subject to any disclaimer, the term of this patent is extended or adjusted under 35 U.S.C. 154(b) by 409 days.

(21) Appl. No.: 12/934,975

(22) PCT Filed: Mar. 25, 2009

(86) PCT No.: PCT/JP2009/055898
§ 371 (c)(1),
(2), (4) Date: Jan. 26, 2011

(87) PCT Pub. No.: WO2009/119635
PCT Pub. Date: Oct. 1, 2009

(65) Prior Publication Data
US 2011/0111262 A1      May 12, 2011

(30) Foreign Application Priority Data
Mar. 28, 2008 (JP) ................................. 2008-088121

(51) Int. Cl.
*G11B 5/66* (2006.01)
(52) U.S. Cl.
USPC .......................................... 428/829; 360/135
(58) Field of Classification Search
None
See application file for complete search history.

(56) References Cited

U.S. PATENT DOCUMENTS

| | | |
|---|---|---|
| 2002/0187368 A1 | 12/2002 | Senzaki et al. |
| 2005/0074636 A1 | 4/2005 | Moriwaki et al. |
| 2005/0181240 A1 | 8/2005 | Ishiyama et al. |
| 2006/0154113 A1 | 7/2006 | Watanabe et al. |
| 2007/0042227 A1 | 2/2007 | Iwasaki et al. |
| 2007/0187227 A1* | 8/2007 | Marinero .................. 204/192.2 |
| 2008/0199733 A1 | 8/2008 | Oka |

FOREIGN PATENT DOCUMENTS

| | | |
|---|---|---|
| JP | 2002-342908 A | 11/2002 |
| JP | 2005-100537 A | 4/2005 |
| JP | 2005-129207 A | 5/2005 |
| JP | 2005-149553 A | 6/2005 |
| JP | 2006-164440 A | 6/2006 |
| JP | 2006-294220 A | 10/2006 |
| WO | 2008/123445 A1 | 10/2008 |

* cited by examiner

*Primary Examiner* — Holly Rickman (57) ABSTRACT

An object of the present invention is to provide a method of manufacturing a perpendicular magnetic recording medium (100) in which both of a coercive force Hc and reliability can be achieved at a higher level even with heating at the time of forming a medium protective layer (126) and to provide the perpendicular magnetic recording medium (100). Thus, in a typical structure of the present invention, in the method of manufacturing the perpendicular magnetic recording medium (100) including at least a magnetic recording layer (122b), which is a ferromagnetic layer of a granular structure in which a non-magnetic grain boundary part is formed between crystal grains each grown in a columnar shape, and a medium protective layer (126) with carbon hydride as a main component in this order on a disk base (110), the method includes a magnetic recording layer forming step of forming the magnetic recording layer (122b) so that the grain boundary part contains oxides of a plurality of types and a medium protective layer forming step of forming the medium protective layer (126) in a state where the disk base (110) having the magnetic recording layer (122b) formed thereon is heated at 160 to 200 degrees Celsius.

2 Claims, 6 Drawing Sheets

| | MAGNETIC RECORDING LAYER: Co-Cr-Pt-TiO₂ | | | | | |
|---|---|---|---|---|---|---|
| | FILM-FORMING TEMPERATURE [°C] | Hc [Oe] | EVALUATION | Dh/Gh | EVALUATION | OVERALL EVALUATION |
| COMPARISON EXAMPLE 1 | 120 | 5100 | ○ | 0.55 | × | × |
| COMPARISON EXAMPLE 2 | 140 | 5030 | ○ | 0.64 | × | × |
| COMPARISON EXAMPLE 3 | 160 | 4920 | × | 0.75 | ○ | × |
| COMPARISON EXAMPLE 4 | 180 | 4760 | × | 0.83 | ◎ | × |
| COMPARISON EXAMPLE 5 | 200 | 4480 | × | 0.95 | ◎ | × |
| COMPARISON EXAMPLE 6 | 220 | 4230 | × | 1.02 | ◎ | × |
| COMPARISON EXAMPLE 7 | 240 | 3810 | × | 1.10 | ◎ | × |

FIG. 6(b)

*1: LOWER MAGNETIC RECORDING LAYER : Co-Cr-Pt-CrO₂
*2: LOWER MAGNETIC RECORDING LAYER : Co-Cr-Pt-CrO₂-SiO₂

| | MAGNETIC RECORDING LAYER: Co-Cr-Pt-SiO₂-TiO₂ | | | | | |
|---|---|---|---|---|---|---|
| | FILM-FORMING TEMPERATURE [°C] | Hc [Oe] | EVALUATION | Dh/Gh | EVALUATION | OVERALL EVALUATION |
| COMPARISON EXAMPLE 8 | 120 | 6070 | ◎ | 0.53 | × | × |
| COMPARISON EXAMPLE 9 | 140 | 6050 | ◎ | 0.65 | × | × |
| EXAMPLE 1 | 160 | 5980 | ◎ | 0.74 | ○ | ○ |
| EXAMPLE 2 | 180 | 5740 | ◎ | 0.84 | ◎ | ◎ |
| EXAMPLE 3 | 200 | 5400 | ○ | 0.95 | ◎ | ○ |
| EXAMPLE 4 (*1) | 180 | 5890 | ◎ | 0.85 | ◎ | ◎ |
| EXAMPLE 5 (*2) | 180 | 6010 | ◎ | 0.86 | ◎ | ◎ |
| COMPARISON EXAMPLE 10 | 220 | 4960 | × | 1.00 | ◎ | × |
| COMPARISON EXAMPLE 11 | 240 | 4350 | × | 1.12 | ◎ | × |

METHOD OF MANUFACTURING PERPENDICULAR MAGNETIC RECORDING MEDIUM AND PERPENDICULAR MAGNETIC RECORDING MEDIUM

TECHNICAL FIELD

The present invention relates to a method of manufacturing a perpendicular magnetic recording medium mounted on an HDD (hard disk drive) or the like of perpendicular magnetic recording type, and the perpendicular magnetic recording medium.

BACKGROUND ART

With an increase in capacity of information processing in recent years, various information recording technologies have been developed. In particular, the surface recording density of an HDD using magnetic recording technology is continuously increasing at an annual rate of approximately 100%. In recent years, an information recording capacity exceeding 160 GB per one magnetic disk with a 2.5-inch diameter for use in an HDD or the like has been desired. To fulfill such demands, an information recording density exceeding 250 Gbits per one square inch is desired to be achieved.

To attain a high recording density in a magnetic disk for use in an HDD or the like, a magnetic disk of a perpendicular magnetic recording type has been suggested in recent years. In a conventional in-plane magnetic recording type, the axis of easy magnetization of a magnetic recording layer is oriented in a plane direction of a base surface. In the perpendicular magnetic recording type, by contrast, the axis of easy magnetization is adjusted so as to be oriented in a direction perpendicular to the base surface. In the perpendicular magnetic recording type, compared with the in-plane recording type, a thermal fluctuation phenomenon can be more suppressed at the time of high-density recording, and therefore the perpendicular magnetic recording type is suitable for increasing the recording density.

Conventionally, as a magnetic recording layer, CoCrPt—$SiO_2$ or CoCrPt—$TiO_2$ has been widely used. In Co, a crystal of a hcp structure (a hexagonal close-packed crystal lattice) grows in a columnar shape. And Cr and $SiO_2$ (or $TiO_2$) are subjected to segregation to form a non-magnetic grain boundary. By using such a granular structure, physically independent fine magnetic grains can be easily formed, and a high recording density can be easily attained.

Also, for example, Patent Document 1 discloses a perpendicular magnetic recording medium in which a recording density can be further increased. This includes two magnetic recording layers, thereby improving a coercive force Hc to increase the recording density. However, an oxide contained in each layer is of one type ($SiO_2$), and each layer has a different composition ratio.

In the perpendicular magnetic recording medium, a medium protective layer is provided that protects the surface of the magnetic recording layer so that the surface is not damaged when the magnetic head collides with the perpendicular magnetic recording medium. The medium protective layer forms a high-hardness coating with carbon overcoat (COC), that is, carbon coating. In the medium protective layer, the carbon coating may include hard diamond-like coupling and soft graphite coupling in a mixed manner (for example, Patent Document 2). Also, a technology of manufacturing a diamond-like coupling protective film by CVD (Chemical Vapour Deposition) is also disclosed (for example, Patent Document 3).

On the other hand, to increase reliability of shock resistance, abrasive resistance, corrosion resistance, and others of the perpendicular magnetic recording medium, it is known that increasing a spectral ratio Dh/Gh with a Raman spectrum of the medium protective layer with carbon hydride as a main component formed on the magnetic recording layer is effective. To increase Dh/Gh of the medium protective layer, it is known that heating the disk base having the magnetic recording layer formed thereon at the time of forming the medium protective layer is effective (for example, Patent Document 4).

Patent Document 1: Japanese Unexamined Patent Application Publication No. 2006-155861
Patent Document 2: Japanese Unexamined Patent Application Publication No. 10-11734
Patent Document 3: Japanese Unexamined Patent Application Publication No. 2006-114182
Patent Document 4: Japanese Unexamined Patent Application Publication No. 2005-149553

DISCLOSURE OF INVENTION

Problems to be Solved by the Invention

However, if the heating temperature at the time of forming the medium protective layer becomes too high, even with an improvement in durability of the medium protective layer, the coercive force Hc decreases. It is thought that this is because the granular structure of the magnetic recording layer is destroyed due to excessive heating. In this manner, the coercive force Hc and reliability have a trade-off relation.

The present invention has been devised in view of the above problem in the vertical magnetic recording medium. An object of the present invention is to provide a method of manufacturing a perpendicular magnetic recording medium in which a high coercive force can be maintained even with heating and both of the coercive force Hc and reliability can be achieved at a higher level, and to provide the perpendicular magnetic recording medium.

Means for Solving the Problem

To solve the above problem, the inventors of the present invention have performed diligent studies. As a result, it was found that, with a plurality of oxides (hereinafter referred to as a "composite oxide") contained in a grain boundary part of the magnetic recording layer, the coercive force Hc can be increased, compared with a magnetic recording layer containing an oxide of a single type. And, according to this, it was found that the coercive force can be maintained higher even with heating, thereby completing the present invention.

That is, to solve the above problem, in a typical structure of the present invention, in a method of manufacturing perpendicular magnetic recording medium including at least a magnetic recording layer, which is a ferromagnetic layer of a granular structure in which a non-magnetic grain boundary part is formed between crystal grains each grown in a columnar shape, and a medium protective layer with carbon hydride as a main component in this order on a base, the method includes: a magnetic recording layer forming step of forming the magnetic recording layer so that the grain boundary part contains oxides of a plurality of types; and a medium protective layer forming step of forming the medium protective layer in a state where the base having the magnetic recording layer formed thereon is heated at 160 to 200 degrees Celsius.

The coercive force Hc and reliability have a trade-off relation. According to the above structure, a magnetic recording layer containing oxides of a plurality of types inherently has a high coercive force Hc, compared with a magnetic recording layer containing an oxide of a single type. Therefore, even if these layers are heated to the same temperature, a high coercive force Hc can be maintained. Therefore, if heating is performed at the above-mentioned temperature, both of the coercive force Hc and reliability can be achieved at a higher level.

To solve the above problem, in another typical structure of the present invention, a perpendicular magnetic recording medium including at least a magnetic recording layer, which is a ferromagnetic layer of a granular structure in which a non-magnetic grain boundary part is formed between crystal grains each grown in a columnar shape, and a medium protective layer with carbon hydride as a main component in this order on a base, wherein the grain boundary part contains oxides of a plurality of types, and the medium protective layer is formed in a state where the base having the magnetic recording layer formed thereon is heated at 160 to 200 degrees Celsius.

The magnetic recording layer has a coercive force Hc equal to or larger than 5000 (Oe), and a peak ratio Dh/Gh when a D peak Dh appearing near 1350 cm−1 of a spectrum obtained by excluding fluorescence from a Raman spectrum at a wave number of 900 cm−1 to a wave number of 1800 cm−1 obtained by pumping the medium protective layer with argon ion laser light having a wavelength of 514.5 nm and a G peak Gh appearing near 1520 cm−1 thereof are subjected to waveform separation with a Gaussian function can be 0.75 to 0.95. This is to maintain high reliability of the perpendicular magnetic recording layer.

The above oxides of the plurality of types can be $SiO_2$ and $TiO_2$. This is because the coercive force Hc is improved with these oxides.

The above perpendicular magnetic recording medium further includes a lower magnetic recording layer below the magnetic recording layer, the lower magnetic recording layer is a ferromagnetic layer of a granular structure in which a non-magnetic grain boundary part is formed between crystal grains each grown in a columnar shape, and the grain boundary part of the lower magnetic recording layer may contain an oxide of one or more types.

This is because, in this manner, the coercive force Hc can be maintained higher by forming the magnetic recording layer with two layers.

Components and description thereof corresponding to a technical idea in the method of manufacturing a perpendicular magnetic recording medium described above are also applicable to the perpendicular magnetic recording medium.

Effect of the Invention

According to the method of manufacturing a perpendicular magnetic recording medium and the perpendicular magnetic recording medium according to the present invention, a perpendicular magnetic recording medium in which both of the coercive force Hc and reliability can be achieved at a higher level can be provided.

BRIEF DESCRIPTION OF DRAWINGS

FIGS. 5 (*a*) and (*b*) are flowcharts depicting processes of manufacturing the perpendicular magnetic recording media of FIG. 1 and FIG. 4, respectively.

DESCRIPTION OF REFERENCE NUMERALS 100, 200 . . . perpendicular magnetic recording medium
110 . . . disk base
112 . . . adhesion layer
114 . . . soft magnetic layer
114*a* . . . first soft magnetic layer
114*b* . . . spacer layer
114*c* . . . second soft magnetic layer
116 . . . preliminary ground layer
118 . . . ground layer
118*a* . . . first ground layer
118*b* . . . second ground layer
120 . . . non-magnetic granular layer
122*a* . . . first magnetic recording layer
122*b* . . . second magnetic recording layer
124 . . . continuous layer
126 . . . medium protective layer
128 . . . lubricating layer

BEST MODE FOR CARRYING OUT THE INVENTION

In the following, with reference to the attached drawings, preferred embodiments of the present invention are described in detail. The dimensions, materials, and others such as specific numerical values shown in these embodiments are merely examples so as to facilitate understanding of the invention, and are not meant to restrict the present invention unless otherwise specified. Note that, in the specification and drawings, components having substantially the same functions and structures are provided with the same reference characters and are not redundantly described, and components not directly relating to the present invention are not shown in the drawings.

Figure 1:
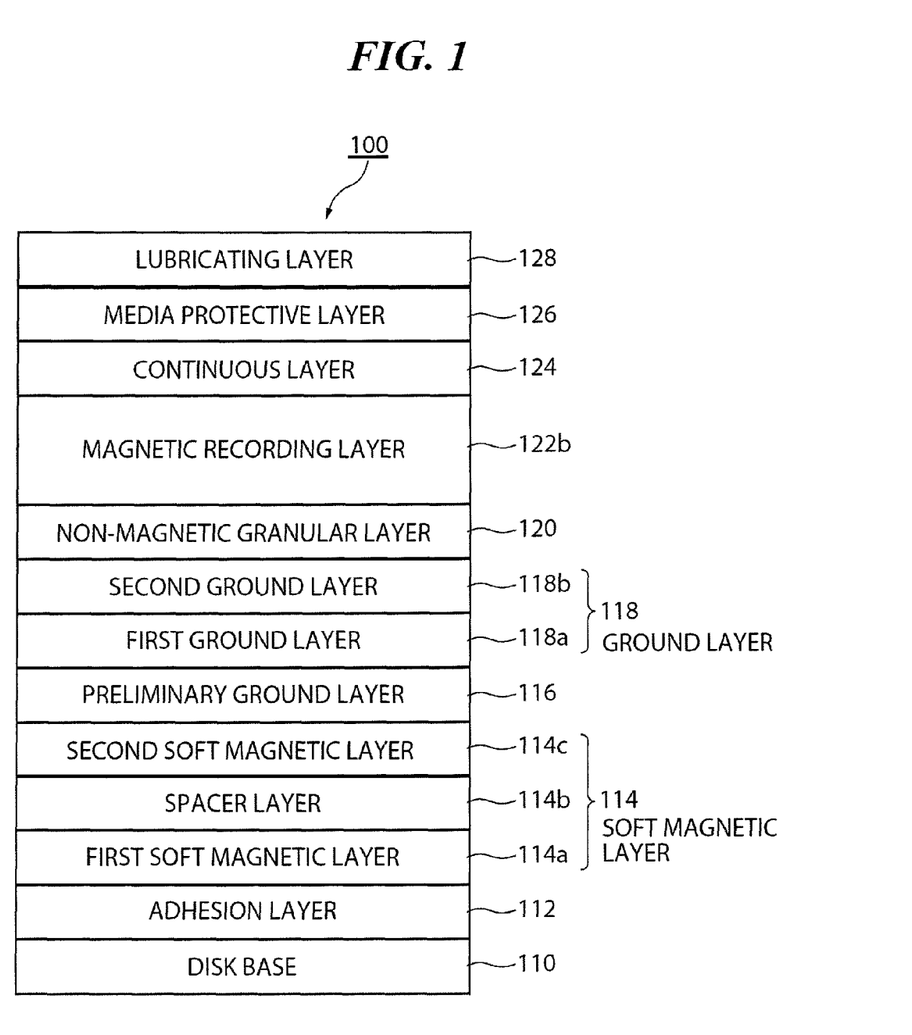
FIG. 1 A diagram for describing the structure of a perpendicular magnetic recording medium according to an embodiment.

Embodiments of the perpendicular magnetic recording medium according to the present invention are described. FIG. 1 is a diagram for describing the structure of a perpendicular magnetic recording medium 100 according to the present embodiment. The perpendicular magnetic recording medium 100 depicted in FIG. 1 is configured of a disk base 110, an adhesion layer 112, a first soft magnetic layer 114*a*, a spacer layer 114*b*, a second soft magnetic layer 114*c*, a preliminary ground layer 116, a first ground layer 118*a*, a second ground layer 118*b*, a non-magnetic granular layer 120, a magnetic recording layer 122*b*, a continuous layer 124, a medium protective layer 126, and a lubricating layer 128. Note that the first soft magnetic layer 114*a*, the spacer layer 114*b*, and the second soft magnetic layer 114*c* together form a soft magnetic layer 114. The first ground layer 118*a* and the second ground layer 118*b* together form a ground layer 118.

As described below, in the perpendicular magnetic recording medium 100 shown in the present embodiment, oxides of a plurality of types (composite oxide) are contained in the magnetic recording layer 122b. With this, the composite oxide is subjected to segregation in the non-magnetic grain boundary.

For the disk base 110, a glass disk molded in a disk shape by direct-pressing amorphous aluminosilicate glass can be used. Note that the type, size, thickness, and others of the glass disk are not particularly restricted. A material of the glass disk can be, for example, aluminosilicate glass, soda lime glass, soda alumino silicate glass, aluminoborosilicate glass, borosilicate glass, quartz glass, chain silicate glass, or glass ceramic, such as crystallized glass. This glass disk is sequentially subjected to grinding, polishing, and chemical strengthening, thereby allowing the smooth, non-magnetic disk base 110 made of chemically-strengthened glass disk to be obtained.

On the disk base 110, the adhesion layer 112 to the continuous layer 124 are sequentially formed by DC magnetron sputtering, and the medium protective layer 126 can be formed by CVD. Then, the lubricating layer 128 can be formed by dip coating. Note that, in view of high productivity, using an in-line-type film forming method is also preferable. In the following, the structure of each layer and its manufacturing method are described.

The adhesion layer 112 is an amorphous ground layer. The adhesion layer 112 is formed in contact with the disk base 110, and includes a function of increasing a peel strength between the soft magnetic layer 114 formed on this layer and the disk base 110, and also a function of making crystal grains of each layer formed on this layer finer and more uniform. When the disk base 110 is made of amorphous glass, the adhesion layer 112 is preferably an amorphous alloy film so as to comply with that amorphous glass surface.

As the adhesion layer 112, for example, any can be selected from a CrTi-type amorphous layer, a CoW-type amorphous layer, a CrW-type amorphous layer, a CrTa-type amorphous layer, and a CrNb-type amorphous layer. Among all, a CoW-type alloy film is particularly preferable because of forming an amorphous metal film containing microcrystallines. The adhesion layer 112 may be a single layer formed of a single material, but may be formed by multilayering a plurality of layers. For example, a CoW layer or a CrW layer may be formed on a CrTi layer. These adhesion layers 112 are preferably subjected to sputtering with a material containing carbon dioxide, carbon monoxide, nitrogen, or oxygen, or have their surface layer exposed with any of these gases.

The soft magnetic layer 114 is a layer in which a magnetic path is temporarily formed at the time of recording so as to let a magnetic flux pass through a recording layer in a perpendicular direction in a perpendicular magnetic recording type. By interposing the non-magnetic spacer layer 114b between the first soft magnetic layer 114a and the second soft magnetic layer 114c, the soft magnetic layer 114 can be configured to include Antiferro-magnetic exchange coupling (AFC). With this, magnetizing directions of the soft magnetic layer 114 can be aligned with high accuracy along the magnetic path (magnetic circuit), the number of perpendicular components in the magnetizing direction becomes extremely small, and therefore noise occurring from the soft magnetic layer 114 can be reduced. As the composition of the first soft magnetic layer 114a and the second soft magnetic layer 114c, a cobalt-type alloy, such as CoTaZr; a Co—Fe-type alloy, such as CoCrFeB and FeCoTaZr; a Ni—Fe-type alloy having a [Ni—Fe/Sn]n multilayered structure or the like can be used.

The preliminary ground layer 116 is a non-magnetic alloy layer. The preliminary ground layer 116 includes an operation of protecting the soft magnetic layer 114, and also a function of orienting in a disk perpendicular direction an easy axis of magnetization of a hexagonal close-packed structure (hcp structure) included in the ground layer 118 formed on the preliminary ground layer.

In the preliminary ground layer 116, a (111) surface of a face-centered cubic structure (fcc structure) is preferably parallel to a main surface of the disk base 110. Also, the preliminary ground layer 116 may have a structure in which these crystal structures and amorphous are mixed. As a material of the preliminary ground layer 116, a selection can be made from Ni, Cu, Pt, Pd, Zr, Hf, Nb, and Ta. Furthermore, an alloy including any of these metals as a main element and any one or more additional elements from among Ti, V, Ta, Cr, Mo, and W may be used. For example, NiW, CuW, CuCr, or Ta can be suitably selected.

The ground layer 118 has a hcp structure, and has an operation of growing crystals of the hcp structure of the magnetic recording layer 122 as a granular structure. Therefore, as the crystal orientation of the ground layer 118 is higher, that is, a (0001) surface of a crystal of the ground layer 118 is more parallel to the main surface of the disk base 110, the orientation of the magnetic recording layer 122b can be improved. As a material of the ground layer 118, Ru is typical. Other than that, a selection can be made from RuCr and RuCo. Ru has a hcp structure, and a lattice space of the crystal is similar to that of Co. Therefore, the magnetic recording layer 122 having Co as a main component can be oriented in good condition.

When the ground layer 118 is made of Ru, by changing the gas pressure at the time of sputtering, a two-layer structure made of Ru can be achieved. Specifically, when the second ground layer 118b on an upper-layer side is formed, the gas pressure of Ar is made higher than that when the first ground layer 118a on a lower-layer side is formed. When the gas pressure is made higher, a free traveling distance of plasma ions to be sputtered is shortened, and therefore the film-forming speed becomes slow, thereby improving the crystal separation ability. Also, with a high pressure, the size of the crystal lattice becomes smaller. Since the size of the crystal lattice of Ru is larger than that of the crystal lattice of Co, when the crystal lattice of Ru is made smaller, it becomes closer to that of Co, thereby further improving the crystal orientation of the Co granular layer.

The non-magnetic granular layer 120 is a non-magnetic granular layer. The non-magnetic granular layer 120 is formed on the hcp crystal structure of the ground layer 118. And, by making a granular layer of the magnetic recording layer 122b grown on the non-magnetic granular layer 120, an operation of separating the magnetic granular layer from a stage of initial growth (leading) is provided. The composition of the non-magnetic granular layer 120 can be a granular structure by forming a grain boundary by causing segregation of non-magnetic substance between non-magnetic crystal grains made of a Co-type alloy. In particular, CoCr—$SiO_2$ and CoCrRu—$SiO_2$ can be suitably used and, furthermore, in place of Ru, Rh (rhodium), Pd (palladium), Ag (silver), Os (osmium), Ir (iridium), and Au (gold) can also be used. Still further, the non-magnetic substance is a substance in which a grain boundary part can be formed around magnetic particles so that an exchange interaction operation between magnetic particles (magnetic grains) is suppressed or interrupted, and can be any as long as it is a non-magnetic substance that is not incorporated into cobalt (Co). Examples can include silicon oxide (SiOx), chrome (Cr), chrome oxide ($CrO_2$), titanium oxide ($TiO_2$), zircon oxide ($ZrO_2$), and tantalum oxide ($Ta_2O_5$).

The magnetic recording layer 122b is a ferromagnetic layer having a granular structure. This granular structure is such that a grain boundary is formed by causing segregation of a non-magnetic substance around magnetic particles made of a hard magnetic body selected from a Co-type alloy, a Fe-type alloy, and a Ni-type alloy, and a non-magnetic grain boundary part is formed between crystal grains grown in a columnar shape. By providing the non-magnetic granular layer 120, these magnetic particles can make an epitaxial growth continuously from their granular structure.

Furthermore, in the present embodiment, a magnetic recording layer forming process is included in which the grain boundary part of the magnetic recording layer 122b is formed so as to contain oxides of a plurality of types as a non-magnetic substance. Here, the types of non-magnetic substance to be contained are not restrictive and, for example, any can be arbitrarily selected from $SiO_2$, $TiO_2$, $Cr_2O_3$, $Ta_2O_5$, CoO, and $Y_2O_3$, Among all, $SiO_2$ and $TiO_2$ are preferable. This is because the coercive force is improved with these oxides. The magnetic recording layer 122b contains, in the grain boundary part, $Cr_2O_3$ and $TiO_2$ as an example of a composite oxide (oxides of a plurality of types). With this, an hcp crystal structure of $CoCrPt$—$Cr_2O_3$—$TiO_2$ can be formed.

The continuous layer 124 is formed of a thin film that is magnetically continuous in an in-plane direction of the main surface of the disk base 110 on the magnetic recording layer 122b having a granular structure. By providing the continuous layer 124, a high-density recording property and a low-noise property of the magnetic recording layer 122b can be improved. In addition, it is possible to enhance the inverted-magnetic-domain nucleation magnetic field Hn, improve the heat-resistant fluctuation characteristic, and improve the overwrite characteristic.

The composition of the continuous layer 124 may be any of CoCrPt, CoCrPtB, and CoCrPtBCu. This is because both of the S/N ratio and the overwrite characteristic are improved by using the continuous layer of any composition.

Note that, as the continuous layer 124, not a single layer but a layer of a CGC structure (Coupled Granular Continuous) may be used in which a thin film (continuous layer) is formed that shows a high perpendicular magnetic anisotropy and a high saturation magnetization Ms. Note that the CGC structure can be configured of a magnetic recording layer having a granular structure, a thin-film coupling control layer made of a non-magnetic substance, such as Pd or Pt, and an exchange energy control layer formed of an exchange multilayered film in which thin films of CoB and Pd are multilayered.

The medium protective layer 126 has carbon hydride as a main component. In the present embodiment, a medium protective layer forming process of forming the medium protective layer 126 is performed by CVD in a state where the disk base having the magnetic recording layer 122b formed thereon is heated at 160 to 200 degrees Celsius.

Note that, the medium protective layer 126 can be formed by forming a film out of carbon by CVD while keeping a vacuum state. The medium protective layer 126 is a protective layer for protecting the perpendicular magnetic recording layer from a shock of the magnetic head. In general, a carbon film formed by CVD has an improved film hardness compared with the one formed by sputtering, and therefore the perpendicular magnetic recording medium can be more effectively protected from a shock from the magnetic head.

Figure 2:
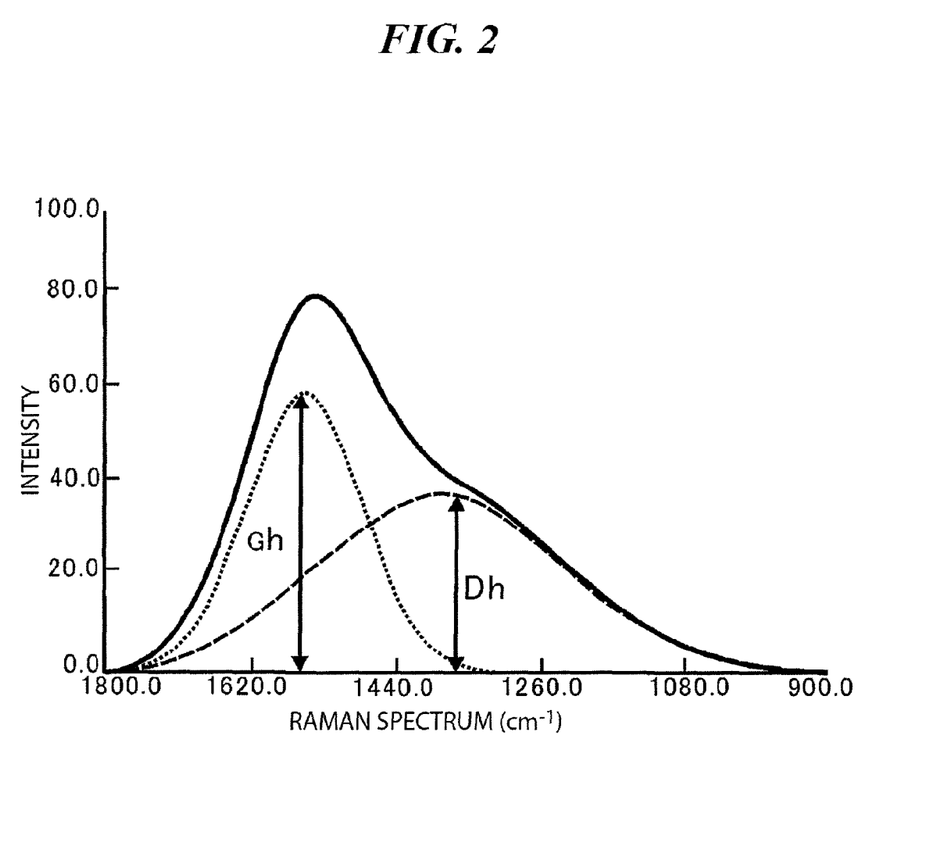
FIG. 2 A descriptive diagram for describing an image of a Raman spectrum.

FIG. 2 is a descriptive diagram for describing an image of a Raman spectrum. Here, within a range of wave numbers of 900 $cm^{-1}$ to 1800 $cm^{-1}$ of a Raman spectrum, a background due to fluorescence was corrected with linear approximation. And, a ratio in peak height between a D peak and a G peak was found as Dh/Gh.

Figure 3:
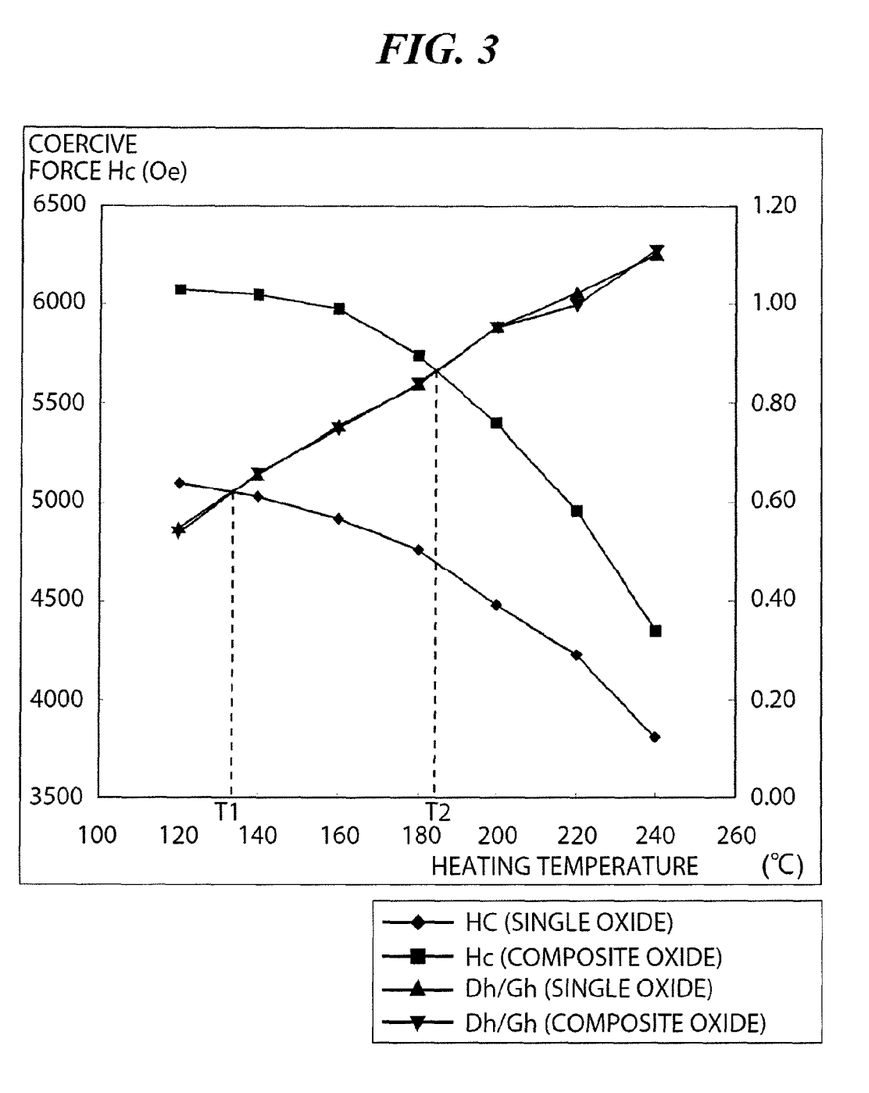
FIG. 3 A graph depicting a trade-off relation between a coercive force Hc and reliability of the perpendicular magnetic recording medium of FIG. 6.

FIG. 3 is a graph depicting a trade-off relation between the coercive force Hc and reliability of the perpendicular magnetic recording medium of FIG. 6, which will be described further below (however, other than fourth and fifth examples). The coercive force Hc is represented by a curve "♦" (a magnetic recording layer containing an oxide of a single type) and a curve "■" (a magnetic recording layer containing a composite oxide). Dh/Gh indicative of reliability is represented by a curve "▲" (a magnetic recording layer containing an oxide of a single type) and a curve "▼" (a magnetic recording layer containing a composite oxide). As depicted in FIG. 3, the coercive force Hc and reliability (Dh/Gh) have a trade-off relation. The magnetic recording layer containing a composite oxide (curve "■") inherently has a high coercive force Hc, compared with the magnetic recording layer containing an oxide of a single type (curve "♦"). Thus, even if the layer is heated to the same temperature, the coercive force Hc can be maintained higher. Moreover, Dh/Gh indicative of reliability (curves "▲" and "▼") approximately match each other. Therefore, as for the perpendicular magnetic recording medium having a magnetic recording layer containing an oxide of a single type, to achieve both of the coercive force Hc and Dh/Gh having a trade-off relation, heating at a temperature T1, which corresponds to a point of intersection of the curves representing these indexes, can be thought. However, if the perpendicular recording medium having a magnetic recording layer containing a composite oxide is heated at a temperature T2, which achieves both of the coercive force Hc and Dh/Gh, both of the coercive force Hc and reliability can be achieved at a higher level.

In the above-described method, a nitriding process is further performed on the surface of the medium protective layer 126. Specifically, after the medium protective layer 126 is formed, it may be further exposed under a nitrogen atmosphere at a flow rate of 100 to 350 sccm for surface treatment of the medium protective layer 126. With the exposure under a nitrogen atmosphere at a flow rate of 100 to 350 sccm, an atomic weight ratio (N/C) between nitrogen (N) and carbon (C) is increased. Thus, adhesiveness and hardness of the medium protective layer 126 and the lubricating layer 128 become suitable.

The lubricating layer 128 can be formed by forming a film out of perfluoropolyether (PFPE) by dip coating. PFPE has a molecular structure in a long chain shape, and is coupled to an N atom on the surface of the medium protective layer 126 with high affinity. With this operation of the lubricating layer 128, a damage or loss of the medium protective layer 126 can be prevented even if the magnetic head makes contact with the surface of the perpendicular magnetic recording medium 100.

Figure 4:
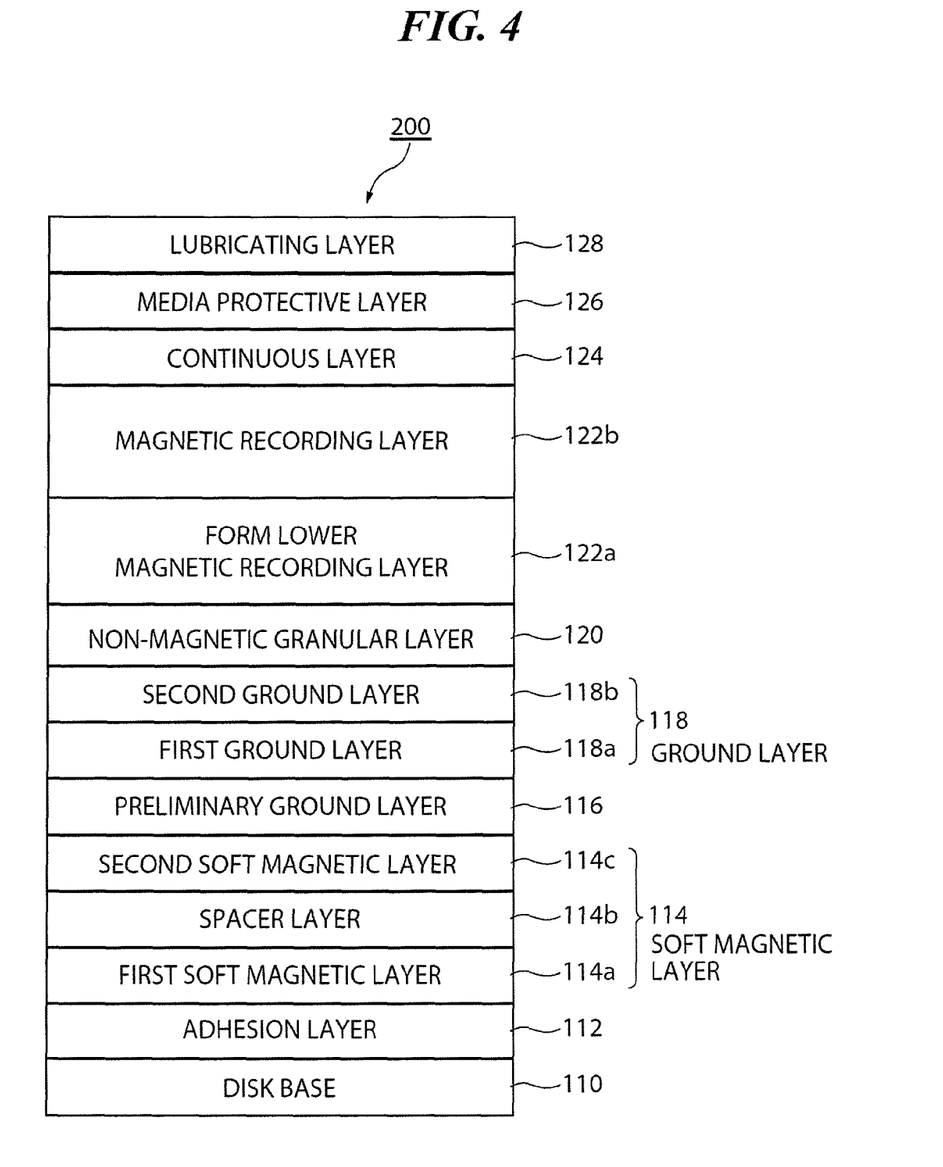
FIG. 4 A diagram for describing the structure of another perpendicular magnetic recording medium according to an embodiment.

FIG. 4 is a diagram for describing the structure of another perpendicular magnetic recording medium 200 according to the present embodiment. A difference from FIG. 1 is that a lower magnetic recording layer 122a is further provided below the magnetic recording layer 122b. The lower magnetic recording layer 122a is a ferromagnetic layer of a granular structure in which a non-magnetic grain boundary part is formed between crystal grains each grown in a columnar shape. And, the grain boundary part of the lower magnetic recording layer 122a contains an oxide of one or more types.

By further providing the lower magnetic recording layer 122a, the coercive force Hc is further improved.

The oxide of one or more types contained in the above-described lower magnetic recording layer 122a may be oxide selected from silicon oxide (SiOx), chrome (Cr), chrome oxide ($CrO_2$), titanium oxide ($TiO_2$), zircon oxide ($ZrO_2$), and tantalum oxide ($Ta_2O_5$), and cobalt oxide (CoO).

As an oxide, any substance can be used as long as it allows a grain boundary part to be formed around magnetic particles so that an exchange interaction operation between magnetic particles (magnetic grains) is suppressed or interrupted. In particular, $SiO_2$ and $TiO_2$ are preferably both included. $SiO_2$ has a characteristic of promoting finer and more isolated magnetic grains, and $TiO_2$ has a characteristic of improving an electromagnetic transducing characteristic (in particular, SNR). And, by combining these oxides for segregation over the grain boundaries of the magnetic recording layer, both of the advantages can be enjoyed.

With the above manufacturing processes, the perpendicular magnetic recording medium 200 can be obtained. In the following, effectiveness of the present invention is described by using an example and comparative examples.

EXAMPLES AND EVALUATION

The process of manufacturing the perpendicular magnetic recording medium 100 of FIG. 1 is described below by using FIG. 5(*a*). On the disk base 110, by using a vacuumed film forming device, the adhesion layer 112 to the non-magnetic granular layer 120 were sequentially formed in an Ar atmosphere by DC magnetron sputtering (step S300). The adhesion layer 112 was of CrTi. In the soft magnetic layer 114, the composition of the first soft magnetic layer 114*a* and the second soft magnetic layer 114*c* was of CoCrFeB, and the composition of the spacer layer 114*b* was of Ru. The composition of the preliminary ground layer 116 was of an NiW alloy with an fcc structure. In the ground layer 118, the first ground layer 118*a* was formed out of Ru under low-pressure Ar, and the second ground layer 118*b* was formed out of Ru under high-pressure Ar. The composition of the non-magnetic granular layer 120 was of non-magnetic CoCr—$SiO_2$.

The magnetic recording layer 122*b* was formed with a structure in examples below (step S310). The composition of the continuous layer 124 was of CoCrPtB (step S320). As for the medium protective layer 126, a film was formed by CVD with the use of carbon hydride $C_2H_4$ after a heating process of heating the disk base having the air recording layer 122*b* formed thereon at 160 to 200 degrees Celsius (step S330). On the surface of the formed medium protective layer 126, a nitriding process is performed by using a nitriding process CN (step S332). With this, the atomic weight ratio (N/C) between nitrogen (N) and carbon (C) is increased, thereby making adhesiveness and hardness of the medium protective layer and the lubricating layer suitable. Then, the lubricating layer 128 was formed by dip coating with the use of PFPE (step S340). Processes to the point in the present example are steps S310 and S330.

Figure 5A:
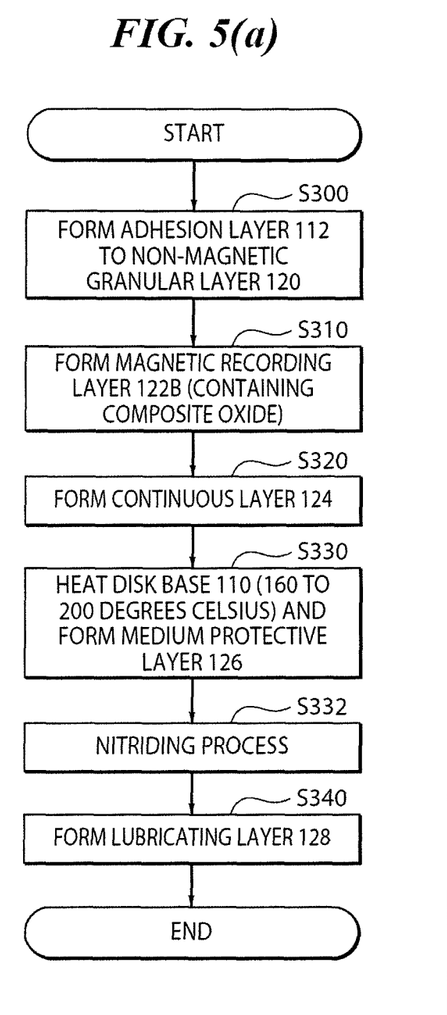
Figure 6A:
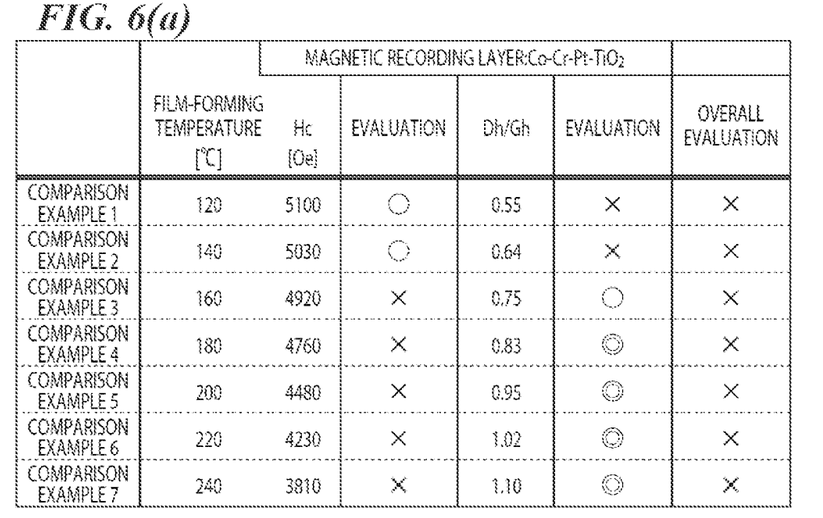
FIG. 6 A diagram for comparing examples and comparison examples of the present invention.
Figure 6B:
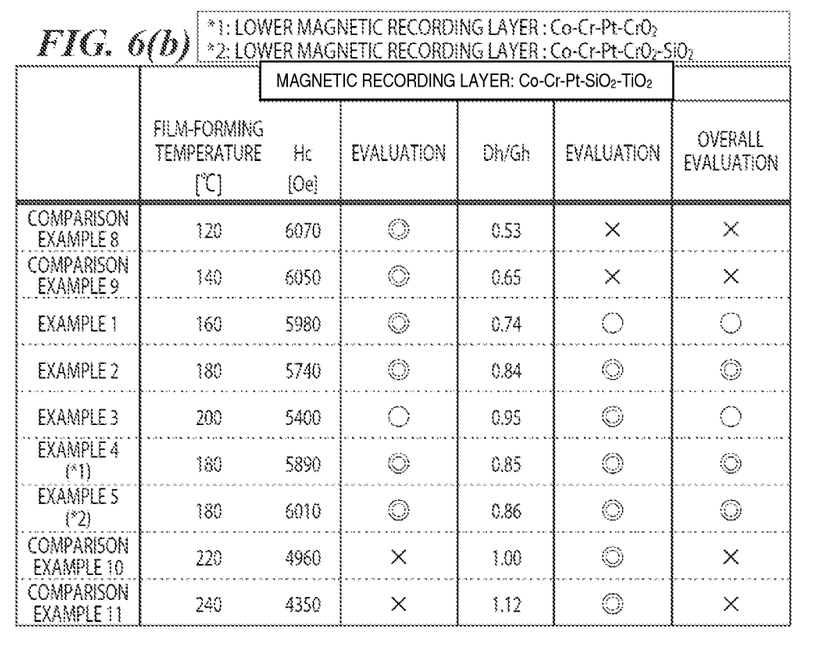

FIG. 6(*a*) is a table of values of the coercive force Hc and Dh/Gh regarding first to seventh comparison examples with the magnetic recording layer (magnetic layer) containing only a single oxide ($TiO_2$) when the disk base is heated at various temperatures at the time of forming the medium protective layer. FIG. 6(*b*) is a table of values of the coercive force Hc and Dh/Gh regarding first to third examples of the perpendicular magnetic recording medium 100 manufactured in the manufacturing process of FIG. 5(*a*) and eighth to eleventh comparison examples at varied temperatures at the time of forming the medium protective layer 126 when the disk base is heated at various temperatures at the time of forming the medium protective layer.

The coercive force Hc of the magnetic recording layer 122*b* of the first to third examples with a temperature at the time of forming the medium protective layer 126 being in a range of 160 to 200 degrees Celsius is equal to or larger than 5000 (Oe). Also, Dh/Gh of the medium protective layer 126 is within a range of 0.75 to 0.95. It can be found that both of these values are maintained at a high level, compared with the values of the first to seventh comparison examples containing only a single oxide ($TiO_2$). Furthermore, it can be found that they are maintained at a high level even compared with the eighth to eleventh comparison examples containing a composite oxide with the temperature at the time of forming a medium protective layer being out of the range of 160 to 200 degrees Celsius.

Figure 5B:
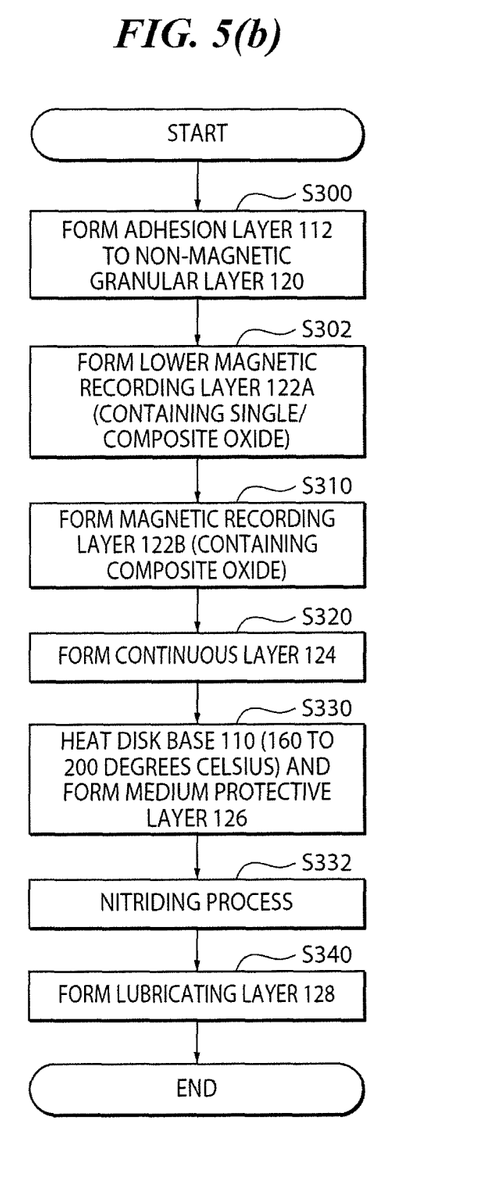

FIG. 5(*b*) is a flowchart of a process of manufacturing the perpendicular magnetic recording medium of FIG. 4. A difference from FIG. 5(*a*) is such that the lower magnetic recording layer 122*a* is formed in the structure of the examples described below before the magnetic recording layer 122*b* is formed (step S302).

The fourth and fifth examples of FIG. 6(*b*) indicate values of the coercive force Hc of the perpendicular magnetic recording medium 200 and Dh/Gh of the medium protective layer 126 manufactured in the manufacturing process of FIG. 5(*b*). The lower magnetic recording layer 122*a* contains a single oxide $CrO_2$ in the fourth example and a composite oxide of $CrO_2$ and $SiO_2$ in the fifth example. In the fifth example, as a lower magnetic recording layer, by adding steps S302 and S332, it can be found that the coercive force Hc and Dh/Gh of the fourth and fifth examples become further higher than the values already maintained at a high level in the first to third examples.

In the foregoing, the preferred examples of the present invention have been described with reference to the attached drawings. Needless to say, however, the present invention is not restricted by such examples. It is clear that the person skilled in the art can conceive various modification examples or corrected examples within a range described in the scope of claims for patent, and it is understood that these examples belong to the technological scope of the present invention.

For example, in the above embodiments and examples, the magnetic recording layer is formed of two layers, that is, the lower magnetic recording layer and the magnetic recording layer (depicted in FIG. 4). However, even when the magnetic recording layer is formed of three or more layers, an advantage of the present invention can be similarly achieved.

INDUSTRIAL APPLICABILITY

The present invention can be utilized as a method of manufacturing a perpendicular magnetic recording medium mounted on an HDD or the like of perpendicular magnetic recording type, and the perpendicular magnetic recording medium.

The invention claimed is:

1. A perpendicular magnetic recording medium comprising:
   a base;
   at least a magnetic recording layer, which is a ferromagnetic layer of a granular structure in which a non-magnetic grain boundary part is formed between crystal grains each grown in a columnar shape;
   a medium protective layer with carbon hydride as a main component in this order on said base; and
   a lower magnetic recording layer below the magnetic recording layer, wherein the grain boundary part of the magnetic recording layer contains $SiO_2$ and $TiO_2$, the medium protective layer is formed in a state where the base having the magnetic recording layer formed thereon is heated at 160 to 200 degrees Celsius, the magnetic recording layer has a coercive force Hc equal to or larger than 5000 (Oe), the lower magnetic recording layer is a ferromagnetic layer of a granular structure in which a non-magnetic grain boundary part is formed between crystal grains each grown in a columnar shape, and the grain boundary part of the lower magnetic recording layer contains $SiO_2$ and $CrO_2$.

2. The perpendicular magnetic recording medium according to claim 1, wherein a peak ratio Dh/Gh when a D peak Dh appearing near 1350 $cm^{-1}$ of a spectrum obtained by excluding fluorescence from a Raman spectrum at a wave number of 900 $cm^{-1}$ to a wave number of 1800 $cm^{-1}$ obtained by pumping the medium protective layer with argon ion laser light having a wavelength of 514.5 nm and a G peak Gh appearing near 1520 $cm^{-1}$ thereof are subjected to waveform separation with a Gaussian function is 0.75 to 0.95.

* * * * *